United States Patent [19]

Meister

[11] Patent Number: 5,477,844
[45] Date of Patent: Dec. 26, 1995

[54] SLURRY RECOVERY SYSTEM FOR A WET CUTTING SAW

[75] Inventor: Donald F. Meister, Overland Park, Kans.

[73] Assignee: Diamant Boart, Inc., Kansas City, Mo.

[21] Appl. No.: 149,990

[22] Filed: Nov. 10, 1993

[51] Int. Cl.⁶ ..................................................... B28D 1/04
[52] U.S. Cl. ......................... 125/14; 125/13.01; 451/450; 451/456
[58] Field of Search .................................... 125/12, 13.01, 125/13.03, 14; 451/450, 488, 456

[56] References Cited

U.S. PATENT DOCUMENTS

| | | | |
|---|---|---|---|
| 2,857,147 | 10/1958 | Lewis | 451/450 |
| 3,119,602 | 1/1964 | Johnson | 451/456 |
| 3,500,591 | 3/1970 | Gawronski et al. | 451/446 |
| 5,215,071 | 6/1993 | Mertes et al. | 125/13.03 |

FOREIGN PATENT DOCUMENTS

| | | | |
|---|---|---|---|
| 0280507 | 11/1989 | Japan | 125/15 |
| 0047708 | 2/1991 | Japan | 125/15 |

Primary Examiner—Robert A. Rose
Attorney, Agent, or Firm—Kokjer, Kircher, Bowman & Johnson

[57] ABSTRACT

A slurry recovery system for a wet cutting saw which includes a watering section, a containment section, a gas-liquid separator section and a discharge section. The watering section contains a pressure gauge, shut-off valve and flowmeter to control the flow of liquid onto the saw blade. The containment section includes a blade cover and bellows which surround the saw blade and form a sawing chamber. A drag bar, which is attached to the lower surface of the bellow, skids along the cutting surface and removes the slurry therefrom. The drag bar includes inner and outer flexible walls that create a vacuum chamber around the saw. The slurry is vacuumed out of the vacuum chamber and conveyed to a gas-liquid separator tank, wherein the slurry and air are separated. The slurry passes to a diaphragm pump and the air passes to a discharge blower. The separator tank includes a blower protector which contains a float and seals. When the slurry level rises above a desired level, the float prevents slurry from passing through an air outlet port. The slurry is drawn from the separator tank, via a diaphragm pump and a surge tank, and is stored in a holding tank for disposal.

20 Claims, 6 Drawing Sheets

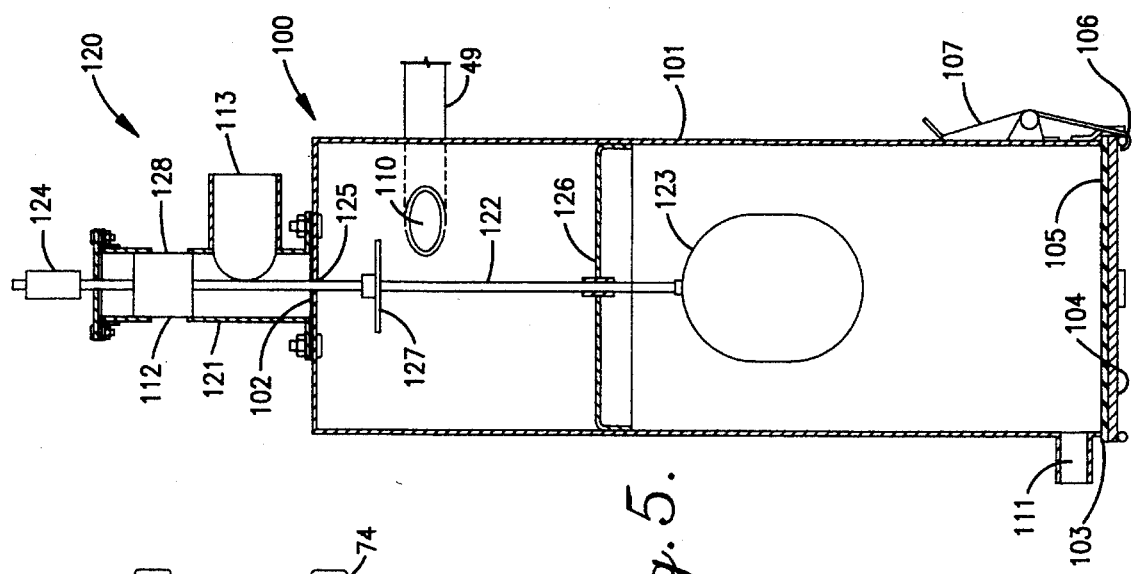
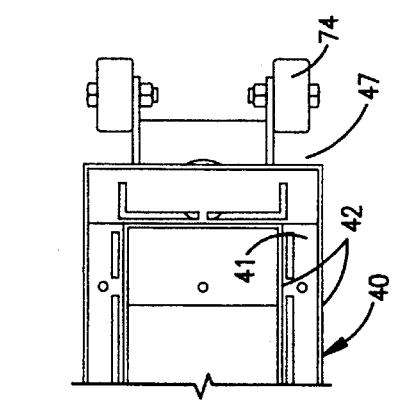
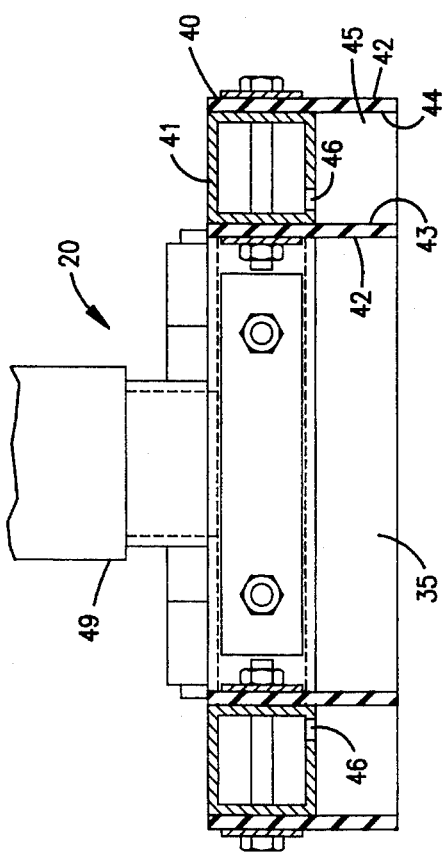
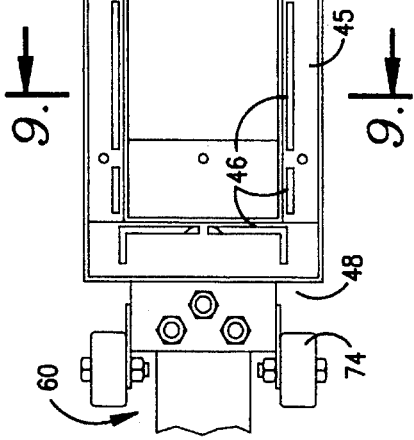
Fig. 5.
Fig. 8.
Fig. 9.

5,477,844

SLURRY RECOVERY SYSTEM FOR A WET CUTTING SAW

BACKGROUND OF THE INVENTION

1. Field of the Invention

This invention relates to a saw for cutting hard materials, such as concrete, stone, metal, etc., while applying liquid to the cut and, in particular, to a slurry recovery system for a wet cutting saw which collects a slurry combination of the liquid plus fines created while cutting the material.

2. Background of the Invention

In the past, conventional concrete saws have utilized a "wet cutting" operation in which a liquid, such as water, is applied to the cut to cool the saw blade, clean the teeth on the blade and to flush cuttings out the cut. Consequently, a bi-product of a wet cutting operation is a heavy, messy slurry mixture of the liquid and the fine particles created by the saw while cutting the concrete.

However, conventional systems do not properly and efficiently dispose of this bi-product. In most conventional system, the slurry was simply washed into storm drains at the construction site, thereby creating a dirty, and potentially slippery, work area. The slurry also plugged drains and fouled the environment.

Conventional systems have been proposed which attempt to recovery the slurry, such as the "BASSE (vacuum type) series" of Diamond Giken Co., Ltd. The BASSE system includes a bellows setup which surrounds the cutting blade. The recovered slurry is passed through a separation system and pumped away.

SUMMARY OF THE INVENTION

Accordingly, it is an object of the invention to provide a slurry recovery system for a wet cutting saw which vacuums the slurry generated by the saw, in order to maintain a clean cutting surface and a clean environment.

Also, it is an object of the invention to provide a containment section within the slurry recovery system that retains water splashed from the saw blade and that is self-adjusting to ensure that the bottom of the containment system maintains an even, flush relation with the cutting surface, thereby facilitating slurry removal.

Also, it is an object of the invention to provide a gas-liquid separator within the slurry recovery system which separates air from the liquid slurry mixture to prevent disruption of the slurry pump's prime.

It is a further object of the invention to prevent the discharge of slurry from the air outlet port of the air-liquid separator to protect the air blower which is connected to the air outlet port.

It is a further object of the invention to provide a slurry pump for pumping the slurry into a holding tank for proper disposal.

These and other objects of the invention will be understood in more detail in connection with the following drawings and description.

BRIEF DESCRIPTION OF THE DRAWINGS

The objects and features of the invention noted above are explained in more detail with reference to the drawings, in which like reference numerals denote like elements, and in which:

FIG. 5 is a side sectional view of the gas-liquid separator, taken along line 5—5 of FIG. 4 in the direction of the arrows;

FIG. 8 is a bottom planal view of the drag bar, taken along line 8—8 of FIG. 2 in the direction of the arrows; and FIG. 9 is an end sectional view of the drag bar, taken along line 9—9 of FIG. 8 in the direction of the arrows.

DETAILED DESCRIPTION OF THE INVENTION

The description hereafter sets forth the construction of the invention, followed by an explanation of its operation.

Figure 1:
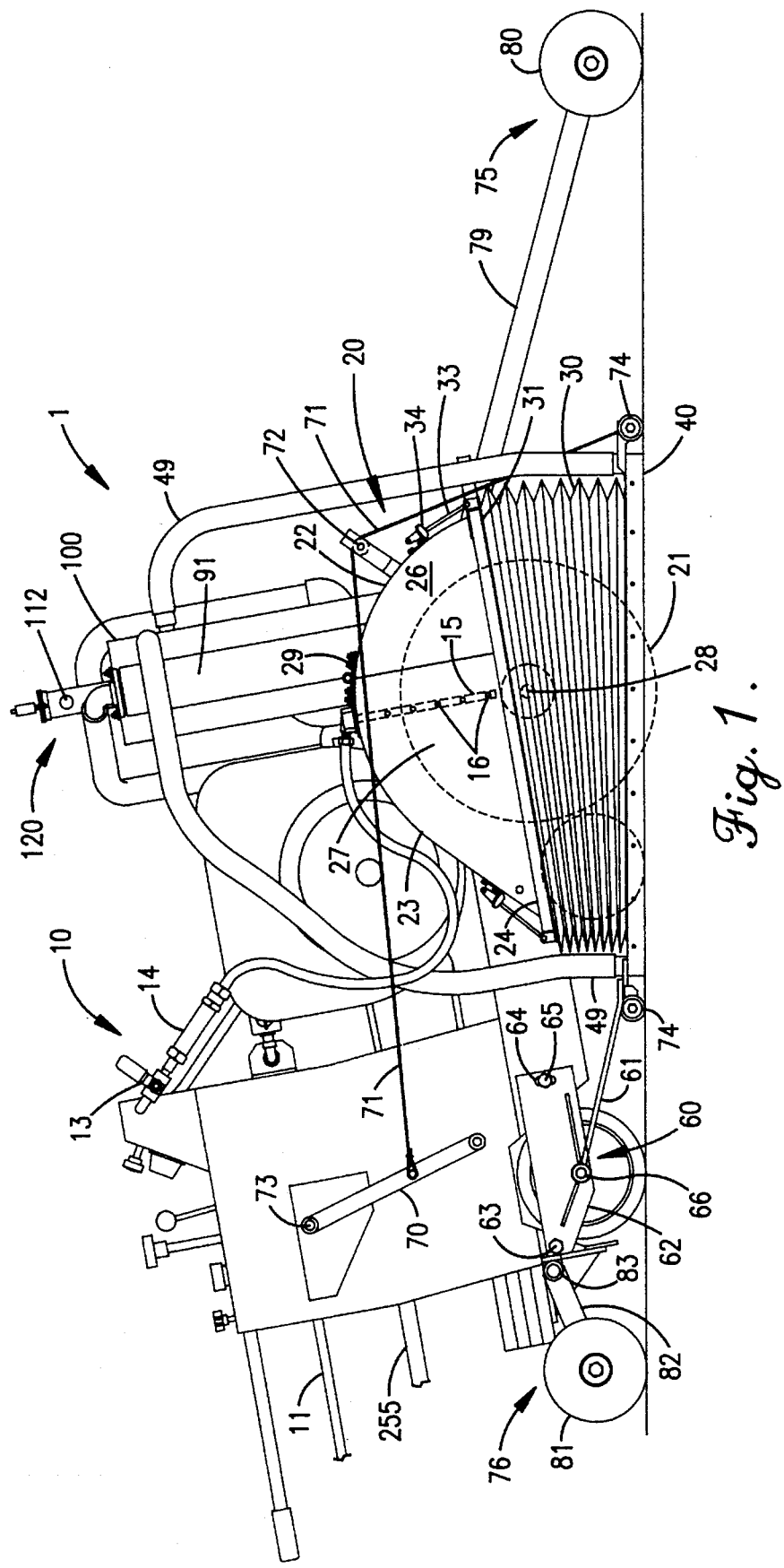
FIG. 1 is a side planal view of the invention with the drag bar against the concrete and the blade guard raised.
Figure 2:
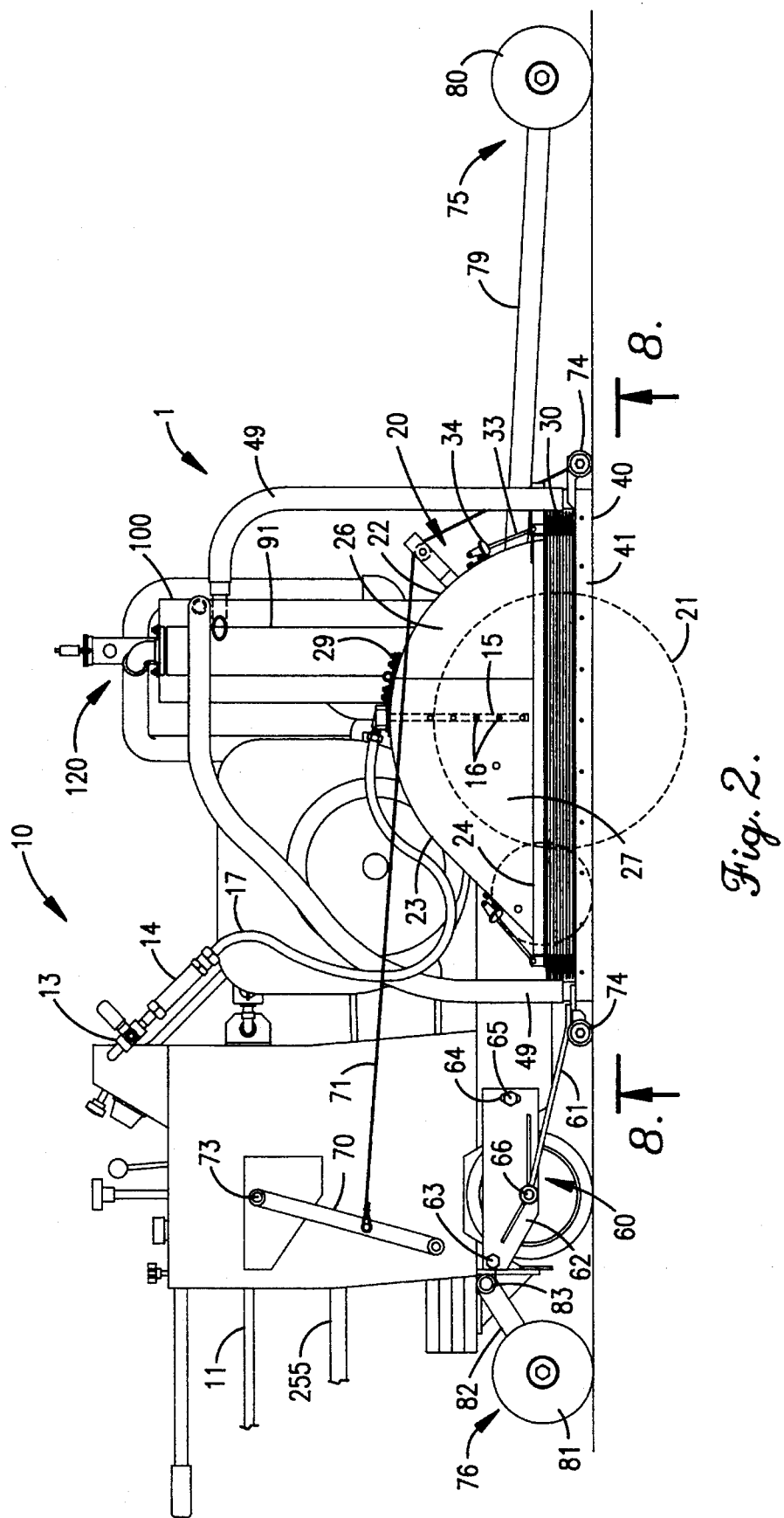
FIG. 2 is a side planal view of the invention with the drag bar and the blade guard lowered against the concrete.
Figure 3:
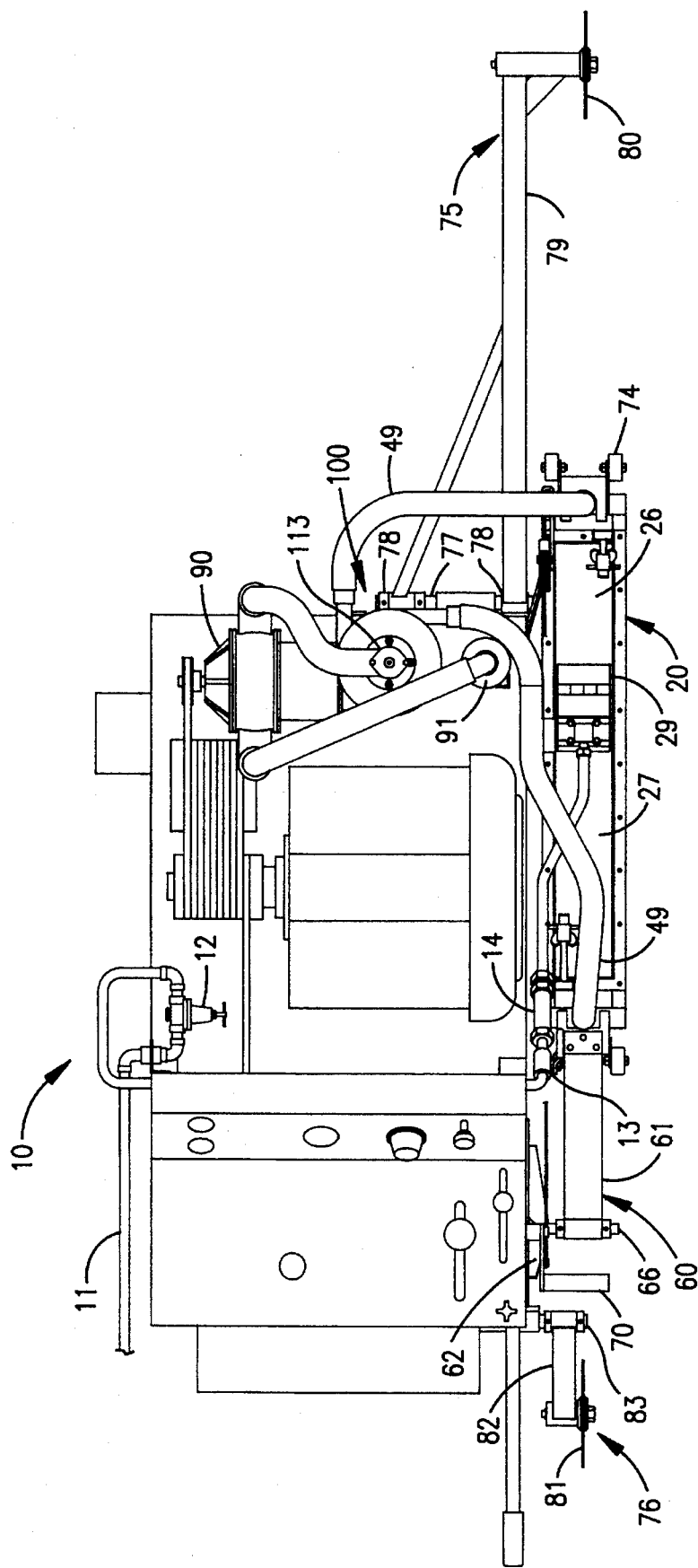
FIG. 3 is a top planal view of the invention.
Figure 4:
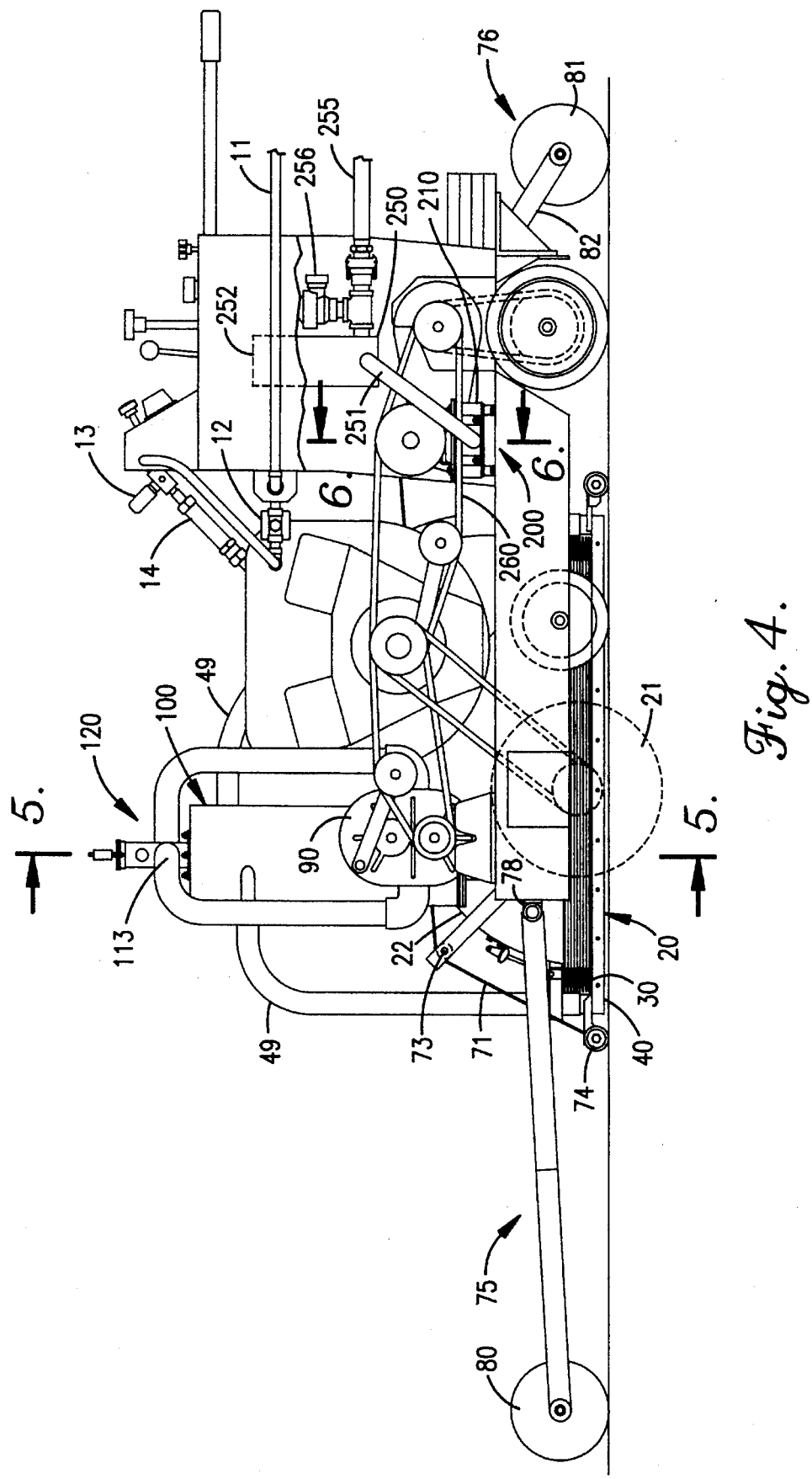
FIG. 4 is a side planal view of the invention showing the side opposite that of FIG. 1, with the drag bar and the blade guard lowered against the concrete.

FIGS. 1–4 illustrates an overall wet cutting saw 1 for cutting hard surfaces, such as concrete, stone, metal, asphalt and the like. The saw 1 includes a watering section 10 (FIG. 3), a slurry containment section 20, a gas-liquid separator 100 and a discharge section 200 (FIG. 4). FIG. 1 illustrates a side view of the saw 1 while the saw blade 21 is raised, and FIGS. 2 and 4 illustrate opposite side views of the saw 1 while the saw blade 21 is lowered.

The watering section 10 includes a water inlet 11, a pressure regulator 12, a ball valve 13, a flowmeter 14, spray tubes 15 and spraying jets 16. Each element of the watering section 10 is inter-connected via threaded pipe couplings and water hoses or pipes. The water inlet 11 receives fresh water from an external source and supplies it to the pressure regulator 12 which allows the user to set a desired flow-rate for supplying water to the saw. Once set, the regulator 12 supplies the water to the ball valve 13 which allows the user to turn the water supply ON and OFF. When turned ON, the ball valve 13 supplies water to the flowmeter 14 which provides a visual indication to the user of the rate at which water flows to the saw. The flow meter 14 is threadably affixed, via a hose 17, to a blade guard 22 and spray tubes 15. Spray tubes 15 are affixed to opposite sides of the blade guard 22 and are arranged to extend radially, downward along opposite sides of the saw blade 21. Each spray tube 15 includes uniformly spaced spray jets 16 which are oriented to spray clean water onto the saw blade 21.

FIGS. 2 and 9 best illustrate the slurry containment section 20 which includes a saw blade 21 housed within a blade guard 22 that is formed with an upper surface 23 having an egg-shaped contour. A lower surface 24 of the blade guard 22 includes a semi-circular cut-out (not shown) on a backside thereof, for accommodating a shaft 28 that drives the saw blade 21. Optionally, the blade guard 22 may be constructed with separate front and back sections 26 and 27, respectively, that are bolted to a hinge that connects the front and rear parts. The front section 26 swings up to provide access to the blade. The lower surface 24 of the blade guard 22 forms a rectangular opening through which the saw blade 21 extends. The lower surface 24 of the blade guard 22 is affixed to, and received within, an expandable bellows 30.

As illustrated in FIGS. 1 and 2, the expandable bellows 30 has an upper surface 31 that fits over the blade guard 22. The bellows 30 includes flexible straps 33 which fasten to forked hooks 34 on the blade guard 22 to hold the bellows 30 firmly against the blade guard 22. The lower surface of the bellows 30 is fixedly secured to a drag bar 40.

Referring to FIGS. 8 and 9, the drag bar 40 includes a hollow tube 41 formed in a rectangular shape, the inner perimeter of which receives, and substantially traces, the outline of the lower surface of the bellows 30. The hollow tube 41 surrounds the saw blade 21 to form a cutting chamber 35 within which the saw blade 21 operates. The hollow tube 41 includes a lower surface that is connected to flexible, resilient walls 42. The resilient walls 42 form rectangular inner and outer dividers 43 and 44 (as illustrated in FIG. 9). The inner and outer dividers 43 and 44 form a vacuum chamber 45 therebetween which surrounds the cutting chamber 35. Within the vacuum chamber 45, the lower surface of the hollow tube containing slots 46 that run parallel and perpendicular to the direction of a cut (i.e. the direction in which the saw runs). Front 47 and back 48 portions of the drag bar are connected to vacuum hoses 49. The above structure provides a path from the vacuum chamber 45, through the slots 46, along the interior of the hollow tube 41 and to the vacuum hoses 49 (FIG. 1). The vacuum hoses 49 are connected to the gas-liquid separator 100 (FIG. 1).

As illustrated in FIGS. 1–3, the drag bar 40 and bellows 30 are connected to the overall saw system at three points. The front and back of the bellows 30 are secured to the blade guard 22 with flexible straps 33, while the back of the drag bar 40 is affixed to the saw housing via rear support assembly 60. The support assembly 60 includes an angular support 61 and a base plate 62. The base plate 62 is pivotally attached, at one end, to the saw housing with a first pivot pin 63. An opposite end of the base plate 62 includes a slot 64 that is loosely bolted to the saw housing, in order that the slot 64 may slide about the bolt 65 during operation. The angular support 61 is pivotally mounted at one end on the base plate 62 at a second pivot pin 66 and bolted at another end to the drag bar 40. As the drag bar 40 is raised and lowered, the base plate 62 and angular support 61 rotate about the first and second pivot pins 63 and 66, respectively. The drag bar 40 also includes rollers 74 which are attached to front and rear portions thereof to support the drag bar 40 when lowered.

Referring to FIG. 1, the drag bar 40 is raised and lowered with a lever and cable assembly, including a cable 71 connected to a lever 70 and the front end of the drag bar 40, via a pulley 72. The lever 70 pivots about a pin 73.

Referring to FIGS. 3 and 4, the saw 1 is attached to front and rear cutting guides 75 and 76 which direct the saw blade 21 along the cutting path. The front cutting guide 75 includes a frame shaped like a right-triangle, the base 77 of which rotates within a bracket 78 bolted to the saw housing. A leg 79 of the frame extends beyond the apex of the triangle and includes a front guide wheel 80 rotatably mounted thereon. The rear cutting guide 76 is mounted behind the saw blade 21 and includes an extension arm 82, one end of which is pivotally mounted on a pin 83 protruding from the side of the saw frame base. A rear guide wheel 81 is rotatably mounted on an opposite end of the extension arm 82. The front and rear guide wheels 80 and 81 are oriented to rotate about horizontal axes and are formed thin enough to rotate within the groove of the cut.

As illustrated in FIG. 5, the gas-liquid separator 100 includes a separator tank 101 which is tangentially connected to the vacuum hoses 49 (see FIG. 3). The separator tank 101 includes slurry inlet and outlet ports 110 and 111, and air inlet and outlet ports 112 and 113. The air outlet port 113 is connected to an air blower 90 (FIG. 4) which is connected to a muffler 91. The separator tank 101 also contains a blower protection assembly 120 to ensure that the slurry does not exit through the air outlet port 113. The blower protection assembly 120 includes a hollow canister 121 that is bolted to the top surface of the separator tank 101. A lower end of the canister 121 is open and is aligned with an air discharge hole 102 in the top of the separator tank 101. The canister 121 contains the air inlet and outlet ports 112 and 113.

The blower protection assembly 120 also includes a rod 122 having a float 123 on one end and a stopper 124 on the other. The float 123 is buoyant and floats on top of the slurry. The rod 122 slides within a guide slot 125 in the top of the canister 121 and within a guide bracket 126. The guide bracket 126 spans the diameter, and is bolted to the interior, of the separator tank 101. A shutoff plate 127 and an air seal 128 are tightly fixed to, and positioned at intermediate points along, the rod 122. The shutoff plate 127 and air seal 128 are aligned in order to seal the air discharge hole 102 and, simultaneously, to open the air inlet ports 112 when the float 123 forces the rod 122 upward.

The separator tank 101 includes an open ended bottom edge 103 which is sealed with a bottom plate 104. The bottom plate 104 is formed with a sealing washer 105 on an upper surface thereof to seal with the bottom edge 103 of the separator tank 101. The bottom plate 104 is secured against the bottom edge 103 of the separator tank 101 with a support ring 106. The support ring 106 is held firmly against the bottom plate 104 with multiple cam-locks 107 (only one is illustrated) evenly spaced around the separator tank 101.

Referring to FIG. 4, the slurry outlet port 111 is fastened, via a hose clamp and a suction hose (not shown), to the discharge section 200. The discharge section 200 includes a diaphragm pump 210, a surge tank 250 and a holding tank (not shown).

Figure 6:
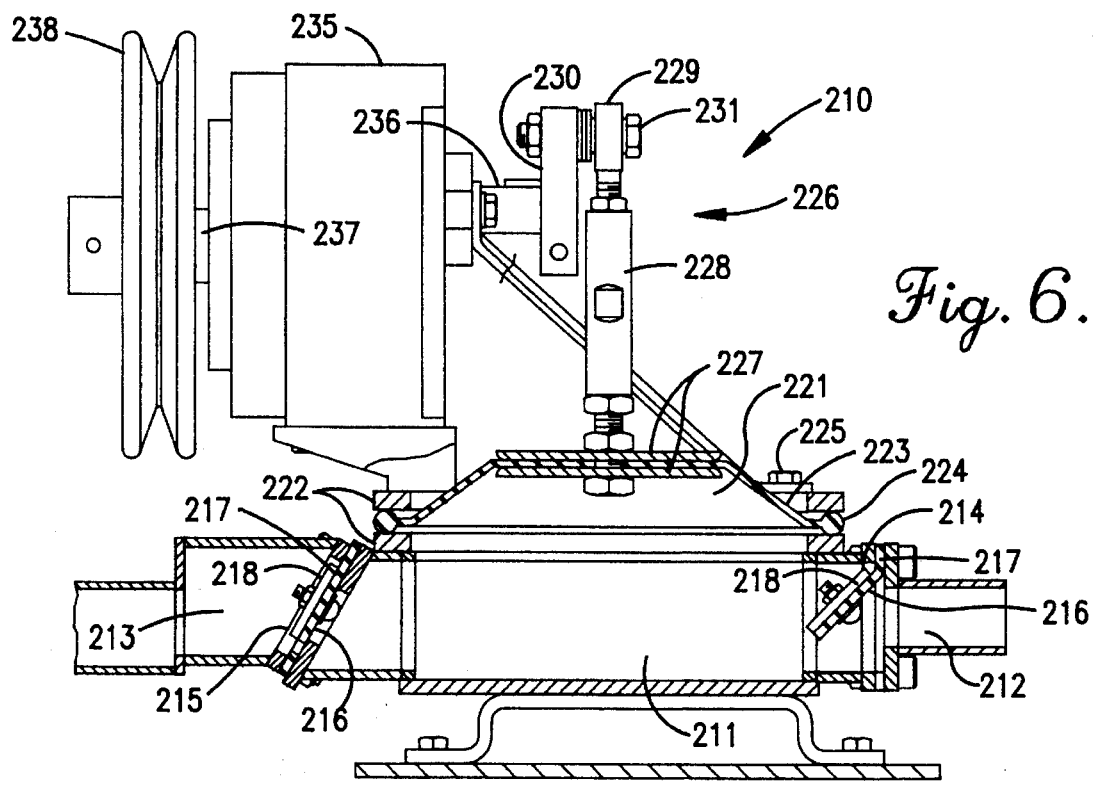
FIG. 6 is a side sectional view of the diaphragm pump, taken along line 6—6 in FIG. 4, showing a sectional view of the pumping chamber while the diaphragm is in an upward position.
Figure 7:
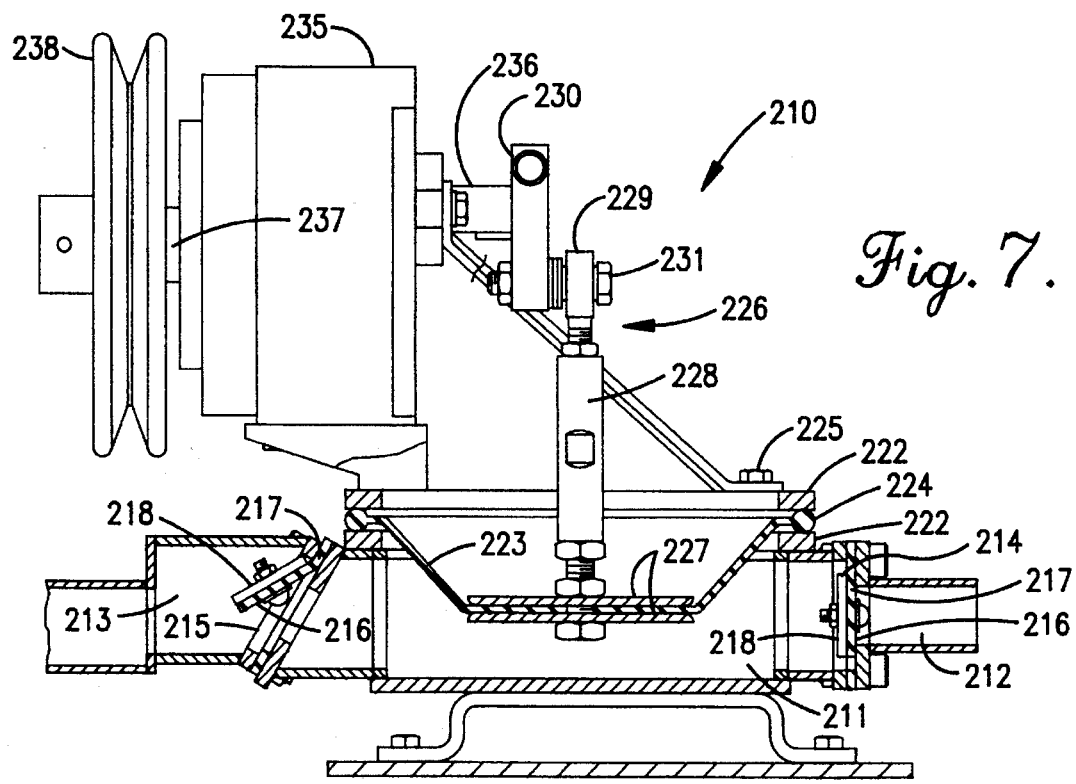
FIG. 7 is a side sectional view of the diaphragm pump, taken along line 6—6 in FIG. 4, showing a sectional view of the pumping chamber while the diaphragm is in a downward position.

FIGS. 6 and 7 illustrate the diaphragm pump 210 which includes a gear reduction assembly 235 and a pumping chamber 211 having inlet and outlet ports 212 and 213. The inlet and outlet ports 212 and 213 include unidirectional check valves 214 and 215, respectively. Each check valve 214 and 215 includes a flexible circular patch 216 formed integrally with a flexible hinge 217. The patches 216 have diameters larger than the diameters of the inlet and outlet ports 212 and 213 and are bolted to rigid washers 218. The flexible hinges 217 are fastened to the pump frame surrounding the inlet and outlet ports 212 and 213, and serve as pivot points for the patches 216.

The pumping chamber 211 is formed with a rectangular cross-section, as viewed from the side (FIGS. 6 and 7), and a circular cross-section, as viewed from above (not shown). The pumping chamber 211 includes an upper surface 221 formed with two overlapping support rings 222 which are bolted to the frame of the diaphragm pump 210. The diaphragm pump 210 includes a flexible diaphragm 223, an outer edge 224 of which is placed between the support rings 222. Bolts 225 fasten the support rings 222 to the pump frame and compress the outer edges 224 of the diaphragm 223 to seal the top of the pumping chamber 211.

The diaphragm 223 is bolted, at its center, to a cam assembly 226. More directly, the central portion of the diaphragm 223 is sandwiched between two flat washers 227 and is bolted to one end of a threaded extension arm 228. An opposite end of the arm 228 includes an eye 229 that swivels about a foot 231 of an L-shaped driving member 230. The L-shaped driving member 230 is attached to an output shaft 236 of the gear reduction assembly 235. An input shaft 237 of the gear reduction assembly 235 includes a belt driven pulley 238, which is driven by the motor (not shown) that also drives the saw.

Referring to FIG. 4, the outlet port 213 of the diaphragm pump 210 is connected to the surge tank 250 via hose clamps and a surge hose 251. The surge tank 250 simply constitutes an enclosed container 252 with inlet and outlet ports. The container 252 retains a predetermined volume of air therein. The surge tank 250 is connected to the holding tank (not shown) via a discharge hose 255. The discharge hose 255 includes a pressure relief valve 256 which opens when the pressure in the discharge hose 255 exceeds a predetermined maximum level.

Next, the operation of the instant invention will be described.

Initially, the user positions the saw such that the front and rear cutting guides 75 and 76 align with the desired cutting path. Next, the user lowers the saw blade 21 and blade guard 22 into a cutting position, and lowers the drag bar 40 and bellows 30 into a vacuuming position (as illustrated in FIG. 2). The lever 70 and cable assembly 71 are used to lower the drag bar 40 for cutting and to raise it while transporting the saw between cuts at a construction site or between construction sites. Once lowered, the bellows 30 expands and contracts in order to maintain an even, abutting relation between the entire lower portion of the drag bar 40 and the cutting surface, independently of the height of the blade guard 22 above the cutting surface. While an expandable style bellows 30 is illustrated in the preferred embodiment, any similar structure may be substituted therefor so long as this substitution confines the slurry and maintains even contact between the drag bar 40 and the cutting surface. Optionally, the bellows 30 need not be included at all, when the saw blade is of a type that does not greatly splatter or splash the slurry mixture. In such a system, the drag bar merely needs to surround the saw blade in order to capture the slurry.

When initiating a cutting operation, the user turns ON the ball valve 13, thereby supplying water to the spray jets 16. The user may adjust the pressure regulator 12 until the flow meter 14 indicates the desired water flow rate. The water sprays onto the sides and teeth of the saw blade 21 in order to cool the saw blade 21, clean the teeth and flush out the cut. The water also flows through the groove cut in the concrete and cleans out fine particles therein. These fine particles become suspended in the water to form a slurry mixture within the cutting chamber 35.

Once the drag bar 40 is lowered onto the concrete, the inner and outer dividers 43 and 44 bow slightly under the weight of the containment section 20. Slurry collects within the cutting chamber 35 and flows under the inner divider 43 and into the vacuum chamber 45. Thereafter, the slurry is drawn or vacuumed into the slots 46, through the hollow tube 41 and out the vacuum hoses 49. The vacuum between the dividers causes air to be drawn under the inner and outer dividers 43 and 44, such that the inner divider 43 also allows slurry thereunder. By using flexible inner and outer dividers 43 and 44, the system allows slurry to enter the vacuum chamber, while maintaining a "negative pressure" zone therebetween. This negative pressure is sufficient to draw or vacuum the slurry through the slots 46 and the vacuum hoses 49.

The air-slurry mixture passes through the vacuum hoses 49 and is pulled into the separator tank 101 at a relatively high speed. As illustrated in FIG. 3, the air-slurry mixture enters the separator tank 101 along its outer periphery at an angle tangential to the tank's outer circumference. The air-slurry mixture swirls around the outer periphery of the separator tank 101 in a centrifuge-like manner, until the slurry portion "falls out" of suspension and drops to the bottom of the separator tank 101. The air is drawn out through the air outlet port 113 in the separator tank 101 by the air blower 90 and is discharged through the muffler 91. The slurry is drawn, by the diaphragm pump 210, out through the slurry outlet port 111 in the bottom of the separator tank 101.

During normal operation, the float 123 floats in the center of the separator tank 101 on top of the slurry that has settled out of the centrifuge. As the slurry level rises, the float 123 rises, thereby pushing the shutoff plate 127 and air seal 128 upward. Thus, when the slurry level rises above a predetermined maximum, the float 123 forces the shutoff plate 127 against, and seals off, the air discharge hole 102. Simultaneously, the air seal 128 opens the air inlet port 112, thereby admitting external air and preventing slurry from discharging through the air outlet port 113 and the air blower 90.

While the shutoff plate 127 seals the air discharge hole 102, the slurry is continually drawn from the separator tank 101 by the diaphragm pump 210. Once the slurry level lowers to an acceptable level, the float 123 opens the air discharge hole 102 and closes the air inlet ports 112. In this manner, the blower protection assembly 120 prevents slurry from passing through the air blower 90.

Throughout operation, the diaphragm pump 210 draws slurry from the separator tank 101, via a suction hose 130, and pumps it to the surge tank 250. The diaphragm pump 210 is continuously driven by a belt and pulley assembly 260. As the pulley 238 is driven, it rotates the L-shaped driving member 230 which moves the extension arm 228 and the diaphragm 223 up and down. The vertical motion of the diaphragm 223 periodically increases and decreases the volume of the pumping chamber 211, thereby creating high and low pressure zones therein. Specifically, as the pulley 238 is driven through a first half of a revolution (180°), the L-shaped driving member 230 pulls the extension arm 228 upward causing the diaphragm 223 to expand, thereby creating a low pressure zone in the pumping chamber 211 (FIG. 6). This low pressure zone causes the check valve 214 to open and the check valve 215 to close, which draws slurry from the separator tank 101 into the pumping chamber 211.

As the pulley 238 rotates through the second half of a revolution (180°), the L-shaped driving member 230 drives the extension arm 228 and the diaphragm 223 downward, thereby causing the pumping chamber 211 to contract and create a high pressure zone therein (FIG. 7). This high pressure zone forces the check valve 215 to open and the check valve 214 to close, which forces the slurry out of the diaphragm pump 210 and into the surge tank 250.

However, during operation, the diaphragm pump 210 creates drastic pressure variations (approximately 5–35 psi) at the outlet port 213 thereof. These pressure variations create a pulsating effect in the surge hose 251 between the diaphragm pump 210 and the surge tank 250. To reduce this pulsating effect, the surge tank 250 is placed immediately after the diaphragm pump 210 to store temporarily the slurry. The output pressure of the surge tank 250 ranges from 10–15 psi. The surge tank 250 contains an enclosed volume of air. When the diaphragm pump 210 discharges, the slurry enters the surge tank 250 thereby increasing the air pressure within the surge tank 250. The air pressure within the surge tank 250 forces the slurry out of the surge tank 250 and into the holding tank. The holding tank stores the slurry until proper disposal.

If the discharge hose 255 between the surge and holding tanks is accidentally blocked, the relief valve 256 opens and allows the slurry to discharge on the ground (or into a second relief tank). This blockage may result in the discharge hose 255 for instance, when a tire parks on the hose. Otherwise, the slurry passes to the holding tank and is stored for proper disposal.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings 1–9 is to be interpreted as illustrative, and not in a limiting sense.

What is claimed is:

1. A slurry recovery system for a wet cutting saw system which sprays liquid onto a saw blade, within a cutting chamber, while sawing a cutting surface, thereby creating a slurry mixture of said liquid and cuttings, said slurry recovery system comprising:

a slurry containment section having a vacuum chamber surrounding, but separated from, said cutting chamber, said vacuum chamber creating a negative pressure zone therein in order to remove air and said slurry therefrom;

an air-liquid separator for receiving said air and slurry and for separating the air from the slurry, said air and slurry being discharged through separate air and slurry outlet ports, said air-liquid separator including protective means for preventing slurry from discharging through said air outlet port; and a discharge section for extracting said slurry from said air-liquid separator and for storing said slurry for disposal.

2. A slurry recovery system according to claim 1, wherein said slurry containment section further includes:

a saw guard surrounding said saw blade;

a bellows removably attached to a lower surface of said saw guard; and a drag bar fixedly attached to a lower surface of said bellows, said bellows expanding and contracting to maintain an even abutting relation between said drag bar and cutting surface.

3. A slurry recovery system according to claim 1, wherein said slurry containment section further includes:

a drag bar which surrounds said cutting chamber, said drag bar forming said vacuum chamber to remove air and slurry.

4. A slurry recovery system according to claim 3, wherein said drag bar further includes:

a hollow tube formed in a rectangular shape around said cutting chamber, said tube having a lower surface that includes slots therein, said lower surface being affixed to flexible inner and outer dividers extending downward from said tube to form said vacuum chamber therebetween, said slurry passing from said cutting chamber to said air-liquid separator by flowing under said inner divider into said vacuum chamber, through said slots and along said hollow tube.

5. A slurry recovery system according to claim 1, wherein said slurry containment section includes a lower surface that is affixed to flexible inner and outer dividers extending downward to form therebetween said vacuum chamber containing said negative pressure zone.

6. A slurry recovery system according to claim 2, wherein said drag bar includes:

rollers for supporting said slurry containment section.

7. A slurry recovery system according to claim 3, wherein said drag bar includes:

rollers for supporting said slurry containment section.

8. A slurry recovery system according to claim 4, wherein said slots are arranged parallel and perpendicular to a cutting direction of said saw blade.

9. A slurry recovery system according to claim 5, wherein said slurry containment section forms said negative pressure zone between said inner and outer dividers in order to remove said slurry while allowing said slurry to flow under said inner divider by constructing said inner and outer dividers in a rectangular pattern and from a flexible material.

10. A slurry recovery system according to claim 2, wherein said bellows include flexible straps at front and rear ends thereof to removably connect said bellows from said saw blade guard.

11. A slurry recovery system according to claim 2, wherein said slurry containment section further comprises:

a rear support assembly, connected between said drag bar and a main housing of the system, for supporting said drag bar and bellows, said rear support assembly including a base plate rotatably fixed to the main housing and an angular support pivotally fixed between the base plate and the drag bar.

12. A slurry recovery system according to claim 2, wherein said slurry containment section further comprises:

a lever and cable assembly for raising and lowering the drag bar.

13. A slurry recovery system according to claim 1, further comprising:

a watering section for supplying and regulating an amount of water sprayed onto the saw, said watering section including:

a pressure regulator to set a water flow rate at a desired level, a ball valve to turn the water ON and OFF, a flowmeter to display, to a user, a rate of water flow, and spray jets to spray the water onto the saw blade.

14. A slurry recovery system according to claim 1, said gas-liquid separator section further comprising:

a separator tank for separating air and slurry by drawing said slurry into said separator tank at an angle tangential to a circumference thereof and creating a centrifugal effect therein.

15. A slurry recovery system according to claim 1, said protective means comprises:

sealing means for opening and closing said air inlet port, shutoff means for sealing off said air-liquid separator from said air outlet port, and regulating means for monitoring a level of slurry within said air-liquid separator, said regulating means causing said sealing means to open said air inlet port and said shutoff means to shutoff said air-liquid separator when the slurry rises above a desired level.

16. A slurry recovery system according to claim 1, said protective means comprises:

flow control means for sealing a channel between said air-liquid separator and said air outlet port when a level of said slurry within said air-liquid separator rises above a desired level.

17. A slurry recovery system according to claim 1, said protective means comprises:

a hollow canister affixed to an upper surface of the air-liquid separator, said canister having said air inlet and outlet ports and an opening in a bottom thereof which aligns with an air discharge hole in a top of the air-liquid separator, and a shaft attached to a float, a shutoff plate and an air seal, said shaft being slidably supported by said canister, said float causing said shutoff plate to close said entrance and said air seal to open said air inlet port when the slurry rises above a predetermined level.

18. A slurry recovery system according to claim 1, said discharge section further comprising:

a diaphragm pump for pumping slurry, via a hose, from the air-liquid separator through a surge tank, and into a holding tank, said surge tank reducing pressure surges within said hose, created by the diaphragm pump.

19. A slurry recovery system according to claim 18, wherein said hose includes a relief valve between said surge and holding tanks to discharge slurry when a pressure within the hose exceeds a desired limit.

20. A slurry recovery system according to claim 18, wherein said diaphragm pump includes:

a diaphragm which forms a top wall of a pumping chamber, and unidirectional check valves which control slurry flow through inlet and outlet ports in said pumping chamber.

* * * * *